United States Patent [19]

Dix et al.

[11] 4,385,173

[45] May 24, 1983

[54] POLYOL POLYETHER PREPARATION PROCESS

[75] Inventors: Peter Dix; George A. Pogany, both of Amsterdam, Netherlands

[73] Assignee: Shell Oil Company, Houston, Tex.

[21] Appl. No.: 248,098

[22] Filed: Mar. 27, 1981

[30] Foreign Application Priority Data

Apr. 21, 1980 [GB] United Kingdom ............. 8013008

[51] Int. Cl.$^3$ ............................................. C07C 41/00
[52] U.S. Cl. ................................................... 536/120
[58] Field of Search ............................... 536/120, 116

[56] References Cited

U.S. PATENT DOCUMENTS

| | | | |
|---|---|---|---|
| 2,945,024 | 7/1960 | De Groote et al. | 536/120 |
| 3,222,357 | 12/1965 | Wismer et al. | 536/120 |
| 3,370,056 | 2/1968 | Yotsuguka et al. | 536/120 |
| 3,449,318 | 6/1969 | Roth et al. | 536/120 |
| 3,865,806 | 2/1975 | Knodel | 536/120 |
| 3,941,769 | 3/1976 | Maassen et al. | 536/120 |

FOREIGN PATENT DOCUMENTS

| | | |
|---|---|---|
| 683884 | 12/1952 | United Kingdom . |
| 736991 | 9/1955 | United Kingdom . |
| 757294 | 9/1956 | United Kingdom . |
| 757309 | 9/1956 | United Kingdom . |
| 781765 | 8/1957 | United Kingdom . |
| 809310 | 2/1959 | United Kingdom . |
| 1002132 | 8/1965 | United Kingdom . |
| 1082673 | 6/1967 | United Kingdom . |

OTHER PUBLICATIONS

Derwent Abstract No. 17346v/10, German Patent No. 2,241,242, 1974.

*Primary Examiner*—Blondel Hazel

[57] ABSTRACT

A process for the preparation of polyethers by reaction between a polyol reactant having a melting point above 80° C. and alkylene oxide, during which a substantially continuous flow of alkylene oxide is passed through a bed of the polyol. The polyether products find particular application, for instance, in the manufacture of polyurethanes.

5 Claims, No Drawings

POLYOL POLYETHER PREPARATION PROCESS

BACKGROUND OF THE INVENTION

The invention relates to an improved process for the preparation of polyethers by the reaction of certain polyols with alkylene oxides. The resulting polyethers are useful as starting materials for the production of polyurethanes, in particular, rigid polyurethane foams.

The invention relates, more specifically, to the reaction of an alkylene oxide with a polyol reactant characterized by a high melting point temperature. Because of the relatively high melting points of certain such polyols, it is often desired to accomplish their reaction with alkylene oxide at a temperature near to or below the melting point of the polyols. The reaction then proceeds rapidly upon contact of the fluid alkylene oxide with the polyol reactant, for instance, a solid in particulate form. However, because of the highly exothermic nature of the reaction, the most straightforward approach to providing this contact, i.e., simply adding the alkylene oxide to a reaction vessel containing the polyol reactant, is complicated by rapid reaction at the particulate surface leading to scorching (charring) and caking of the polyol and excessive formation of reaction by-products. While vigorous agitation of the reaction mixture may to some extent alleviate these problems, as a practical matter effective agitation is difficult in a reaction vessel containing a high loading of the polyol.

It has been suggested that the desired reaction be carried out in an inert liquid reaction medium, for instance, in a xylene solvent. Performing the reaction in this manner is found, however, to considerably reduce the rate at which polyether is obtained. Reaction in a solvent medium also necessitates, of course, separation of the product from the solvent.

Attempts have further been made to perform the reaction in the presence of water or a low molecular weight polyhydroxy compound such as glycerol. Yet, the presence of water or glycerol reduces the functionality of the product (i.e., the average number of alkylene oxide molecules reacted with a molecule of the polyol). A relatively high functionality is known to be desirable for many applications of the product polyethers.

SUMMARY OF THE INVENTION

It has now been found that the etherification reaction between fluid alkylene oxide and certain polyol reactants can be very advantageously conducted in a process in which the alkylene oxide is passed through a contained bed of the polyol.

Accordingly, in the process in which polyol polyethers are prepared by reaction of a polyol reactant having a melting point above about 80° C. with one or more fluid alkylene oxides, the invention may be summarily described as the improvement which comprises conducting the reaction in a contained bed of the polyol reactant through which is passed a continuous flow of the fluid alkylene oxide. The circulating or passing of a continuous flow of fluid alkylene oxide through the bed is intended to signify that the alkylene oxide is, at substantially all times during the course of the reaction process, both introduced into and withdrawn from the polyol reactant bed.

Processing in this manner circumvents to a great extent the several aforementioned problems specifically associated in the art with polyether preparation from high melting point polyols. Advantage is most directly realized in the efficient preparation of polyol polyethers particularly suited for use in the production of polyurethanes.

DESCRIPTION OF THE PREFERRED EMBODIMENTS

The invention is directed, in the most general sense, to improvement in the manner of contact between the polyol and fluid alkylene oxide reactants for purposes of preparation of polyol polyethers. In its other aspects, the reaction process can be practiced according to teachings and suggestions of the art. Thus, for instance, reaction temperatures between about 50° and 160° C., as have typically been employed for the alkoxylation of active hydrogen containing compounds, may suitably be utilized in the process of the invention. Temperatures between 80° and 120° C. are generally preferred. Since it is desirable to maintain the alkylene oxide in the vapor state, pressures up to the standard vapor pressure of the alkylene oxide at the reaction temperature are preferred; particularly preferred are pressures in the range of from about 1 to 10 atmospheres. In many cases it is advantageous to carry out the reaction in the presence of a catalyst, for instance, an alkali hydroxide, e.g., potassium hydroxide, or an amine, preferably a secondary or tertiary amine. Other substances, as are known in the art to benefit the desired reaction, may also be present in the polyol bed or in the alkylene oxide flow passed therethrough. For instance, while the presence of large amounts of water in the reaction is generally to be avoided, water in small quantities, e.g., no more than 0.2–1.0 mol per mol of polyol, may serve to reduce the induction time of the reaction.

For purposes of the process of the invention, suitable polyol reactants are most conveniently described as those having a melting point greater than about 80° C. It is perhaps more accurate, however, to describe suitable polyol reactants as those which do not have a melting point below about 80° C., since some polyol compounds which are solid at temperatures up to 80° C. and greater, decompose rather than melt as temperature is further increased. The invention is, of course, intended for practice below the decomposition temperature of the particular polyol employed. The process of the invention is thus performed at a temperature at which the polyol is either a solid or a liquid of relatively high viscosity.

Preferably the process of the invention is operated so that the polyol does not have a melting point below the bulk temperature of the alkylene oxide reactant flow which exits the polyol reaction bed. More preferably, the reaction is conducted at a temperature at which the polyol is substantially in solid form, although because of the exothermic nature of the reaction in the bed there may be present within the reaction mixture regions in which the temperature exceeds the melting point of the polyol and a minor portion of the polyol may be in the liquid state. Most preferably, essentially all of the polyol reactant is in the solid state during the practice of the reaction process of the invention and is in a finely divided or particulate form.

Examples of polyol starting materials, having a melting point greater than about 80° C., include trimethylolethane, trimethylolpropane, pentaerythritol, methylglucosides, mannitol, dulcitol, and dipentaerythritol, as well as glucamine, glucosamine, glucosaminol and the N-alkyl or N-aryl derivatives thereof. The present process is particularly suitable for the conversion of sorbitol or sucrose, yielding polyethers which are in great demand as starting materials for the production of rigid polyurethane foams. If desired, mixtures of polyols may be used in the present process, as well as mixtures of one or more of such polyols with other active hydrogen-containing compounds.

The alkylene oxide reactant is suitably of the class conveniently employed in the production of polyol polyethers. Preferred alkylene oxides are ethylene oxide, propylene oxide, butylene oxide, and mixtures thereof. If desired, one alkylene oxide may be initially utilized in a first stage of the etherification reaction and another alkylene oxide in a later stage. The amount of alkylene oxide used in the reaction according to the invention, relative to the quantity of polyol converted, determines the functionality and molecular weight of the polyether product.

The process of the invention is necessarily carried out by passing an essentially continuous flow of the alkylene oxide over a contained bed of the polyol. The bed is preferably contained within a reaction vessel, provided with a filter means at the outlet to permit exit of the alkylene oxide flow while retaining solid polyol within the bed. Examples of suitable filtering means are perforated plates, screens, and bundles of fibers formed of glass, metal, or ceramic materials.

Although the polyol reactant may be held in a stationary bed, it is often preferred that the polyol be of particulate form and the the alkylene oxide flow be adjusted to maintain the polyol as a fluidized bed over at least a part of the reaction time. As the terminology is used in the art, a bed is a fluidized bed if the weight of the polyol particles is offset by the drag force of the flowing alkylene oxide acting on the particles.

Essentially continuous flow of alkylene oxide through (i.e., into and out of) the polyol bed is a factor critical to the success of the invention. In preferred embodiments, this flow is provided by circulation, with the alkylene oxide withdrawn from an outlet of the bed being reintroduced into a bed inlet. As the desired reaction commences, the circulating alkylene oxide flow is depleted in formation of the polyether; fresh alkylene oxide is preferably added to maintain circulation flowrate. An alkylene oxide flow which circulates through, or otherwise passes from, the polyol bed also typically contains polyether product.

Under preferred practice of the invention, a circulating alkylene oxide stream is cooled by heat exchange to maintain desired temperature in the reaction bed. Bulk temperature changes in the bed over the course of the reaction are preferably held to less than 10° C., most preferably to less than 5° C.

In many cases, it is advantageous to practice an embodiment of the invention in which the alkylene oxide reactant stream is circulated through multiple (e.g., two to four) polyol beds, either in series or parallel flow. Particularly preferred is parallel circulation of alkylene oxide through multiple beds. Continuous operation under the invention is then made possible, as one or more polyol-containing reaction vessels may be bypassed when operations such as reloading with polyol and cleaning are required. Processing benefits may also be realized by provisions for reversing the flow of alkylene oxide through the polyol bed during the course of the reaction.

After practice under the invention has reached a desired stage of polyol conversion, the polyether or polyethers formed can be isolated by stripping or other conventional methods, such as neutralization or purification by treatment with active carbon or natural or synthetic absorbent earths, if necessary followed by filtration.

The polyethers obtained in the process of the invention show a high reactivity with respect to isocyanates and are particularly suitable for the production of cellular or non-cellular polyurethanes in accordance with the general methods described in the literature, for instance by reacting the polyethers, possible admixed with other polyhydroxy compounds, with organic polyisocyanates, if desired in the presence of other substances, such as foaming agents, catalysts, surface-active agents, flame-retarding agents and other additives according to the methods known in the art.

A process in accordance with the invention and a use of one polyol polyether produced thereby are described by reference to the following example.

EXAMPLE

A 500 ml reaction vessel having an inlet and an outlet, both provided with closely fitting sintered metal filters, was utilized to contain a 405 g sucrose polyol reactant bed. Connections were made between the inlet and the outlet of this bed and a 2.5 liter stainless steel pressure chamber. Volatiles were removed from the chamber by application of vacuum; a mixture of 450 grams of propylene oxide and 4.5 grams of dimethylaminoethanol was then introduced and heated to 90° C. Circulation of the propylene oxide/dimethylaminoethanol mixture (i.e., from the chamber, through the polyol, and back to the chamber) was established and maintained at a rate sufficient to produce a fluidized bed in the reaction vessel. The temperature in the pressure chamber was held approximately constant at 90° C. by use of cooling coils therein. As the reaction proceeded, additional propylene oxide was introduced into the chamber, and thus into the circulating stream, in order to maintain constant pressure in the system. A total of 1095 gram of propylene oxide was added in this manner over a total reaction time of 10 hours. The resulting product mixture was then removed from the chamber and stripped under vacuum to separate unreacted propylene oxide. The propoxylated sucrose polyether product was characterized by a hydroxyl valve (HV), expressed in mg KOH/g, of 415 and a viscosity of 5761 cS at 38° C.

This sucrose polyether was used to prepare two blends, designated A and B, described as follows, in terms of percent by weight (%w):

| Blend A | |
|---|---|
| Sucrose polyether | 80.0% w |
| Polyethylene glycol (HV = 561) | 4.4% w |
| Polyethylene glycol (HV = 374) | 15.6% w |
| Blend B | |
| Sucrose polyether | 80.0% |
| Polyethylene glycol (HV = 561) | 9.6% w |
| Polypropylene glycol (HV = 281) | 10.4% w |

For both blends, the following formulation, in terms of parts by weight (pbw), was used to produce a polyurethane foam in an open-topped wooden mold:

| | |
|---|---|
| Polyol blend (A or B) | 100 pbw |
| Silicone oil | 1.0 pbw |
| Water | 1.0 pbw |

| -continued | |
|---|---|
| Dimethylcyclohexylamine | 2.5 pbw |
| Trichlorofluoromethane | 30.0 pbw |
| Diphenylmethane diisocyanate* | 127 pbw |

*(A commercial product under the registered trademark Caradate-30.)

During foaming of the formulations in the mold, the following reactivites, expressed in seconds, were observed:

| Formulation based on blend | Cream time | Fiber time | Tack-free time |
|---|---|---|---|
| A | 13 | 55 | 75 |
| B | 16 | 70 | 80 |

The physical properties of the foams produced were:

| Foam based on blend | Density (kg/m$^3$) | Closed cell content (%) | Compressive strength parallel to rise (kN/m$^2$) |
|---|---|---|---|
| A | 28.0 | 90.4 | 210 |
| B | 29.9 | 92.4 | 238 |

We claim as our invention:

1. In the process for the preparation of polyol polyethers by the reaction of polyols with alkylene oxides which comprises contacting a polyol reactant having a melting point above about 80° C. with a fluid alkylene oxide reactant, the improvement which comprises passing a flow of the fluid alkylene oxide through a contained bed of the polyol substantially in solid form.

2. The process of claim 1, wherein the flow of the fluid alkylene oxide is continuously circulated through the polyol bed.

3. The process of claim 2, wherein the polyol is in particulate form.

4. The process of claim 3, wherein the alkylene oxide flow is circulated through the bed at a rate sufficient to maintain a fluidized polyol bed.

5. The process of claim 4, wherein the alkylene oxide is selected from the class consisting of ethylene oxide, propylene oxide, butylene oxide, and mixtures thereof.

* * * * *